(12) United States Patent
Pai et al.

(10) Patent No.: US 10,248,461 B2
(45) Date of Patent: *Apr. 2, 2019

(54) TERMINATION POLICIES FOR SCALING COMPUTE RESOURCES

(71) Applicant: Amazon Technologies, Inc., Reno, NV (US)

(72) Inventors: Derek Solomon Pai, Seattle, WA (US); Eric Samuel Stone, Seattle, WA (US); Mihir Rajendrabhai Patel, Seattle, WA (US); Thomas Hans Deml, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/797,190

(22) Filed: Oct. 30, 2017

(65) Prior Publication Data

US 2018/0060129 A1    Mar. 1, 2018

Related U.S. Application Data

(63) Continuation of application No. 13/768,877, filed on Feb. 15, 2013, now Pat. No. 9,804,890.

(51) Int. Cl.
*G06F 9/50* (2006.01)
*G06F 9/455* (2018.01)

(52) U.S. Cl.
CPC ............ *G06F 9/5022* (2013.01); *G06F 9/455* (2013.01); *G06F 9/45558* (2013.01); *G06F 9/50* (2013.01); *G06F 9/5005* (2013.01); *G06F 9/5077* (2013.01); *G06F 2009/45562* (2013.01); *G06F 2009/45575* (2013.01)

(58) Field of Classification Search
None
See application file for complete search history.

(56) References Cited

U.S. PATENT DOCUMENTS

| 7,075,904 B1* | 7/2006 | Manish | H04L 12/1886 370/312 |
| 7,503,044 B2* | 3/2009 | Chew | G06F 9/44594 718/100 |
| 2005/0063417 A1* | 3/2005 | Berranger | G06F 9/5027 370/465 |
| 2013/0179574 A1* | 7/2013 | Calder | G06F 9/5033 709/226 |
| 2013/0179895 A1* | 7/2013 | Calder | G06F 9/5077 718/104 |
| 2014/0223423 A1* | 8/2014 | Alsina | G06F 8/65 717/173 |

* cited by examiner

*Primary Examiner* — Qing Yuan Wu
(74) *Attorney, Agent, or Firm* — Hogan Lovells US, LLP

(57) ABSTRACT

Approaches are described for enabling a user to specify one or more termination policies that can be used to select which instances in a group of virtual machines (or other compute resources) allocated to the user should be terminated first when scaling down the group of virtual machine instances. The termination policies can be utilized by an automatic scaling service when managing the resources in a multi-tenant shared resource computing environment, such as a cloud computing environment.

14 Claims, 7 Drawing Sheets

TERMINATION POLICIES FOR SCALING COMPUTE RESOURCES

CROSS-REFERENCE TO RELATED APPLICATIONS

This application is a continuation of pending U.S. patent application Ser. No. 13/768,877, filed on Feb. 13, 2015, entitled "TERMINATION POLICIES FOR SCALING COMPUTE RESOURCES," which is incorporated herein by reference in its entirety for all purposes.

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

In these environments, it is often desirable to scale the resources allocated to a user or customer as demand for those resources increases or decreases through time. However, because the customer normally does not have physical access to the resources in the data center of the service provider, conventionally, users have not been provided with a desired level of control over how those resources are to be scaled.

BRIEF DESCRIPTION OF THE DRAWINGS

Various embodiments in accordance with the present disclosure will be described with reference to the drawings, in which.

DETAILED DESCRIPTION

Figure 1:
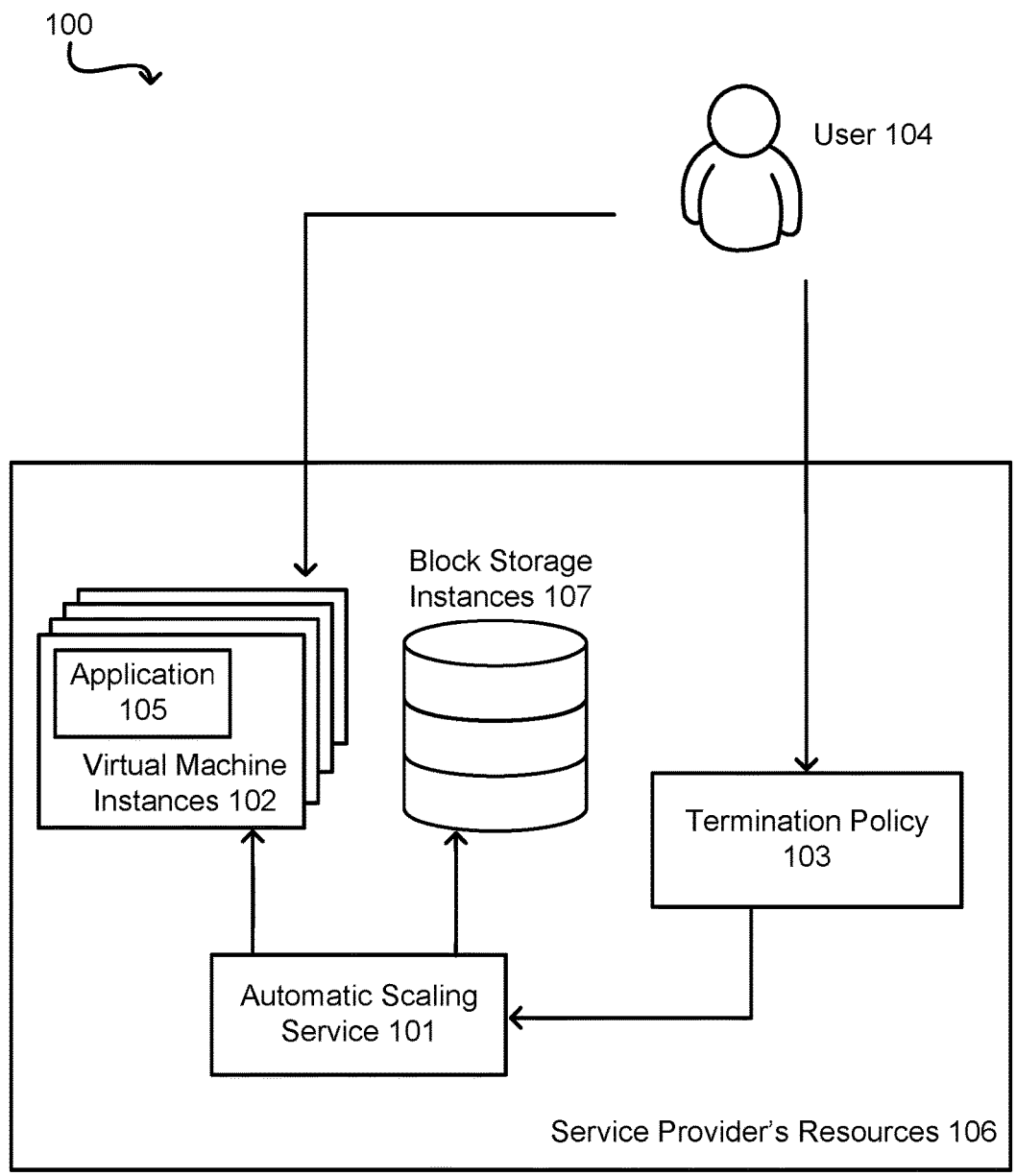
FIG. 1 illustrates an example of a user-specified termination policy used to control the scaling of resources allocated to a user, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for scaling of compute resources, such as virtual machines, allocated to a user. In particular, various embodiments provide approaches for enabling a user to specify one or more termination policies that can be used to select which instances in a group of virtual machines (or other compute resources) allocated to that user should be terminated (e.g., de-provisioned, shut down, etc.) first when scaling down the group of virtual machine. The termination policies can be utilized by an automatic scaling service when managing the compute resources in a multitenant shared resource computing environment, such as a cloud computing environment. In this environment, a service provider (e.g., cloud computing provider) may provision a number of virtual machine instances for a user on one or more host computing devices, where the virtual machines execute an application on behalf of the user using the physical resources in a resource center of the service provider.

In various embodiments, when requesting the compute resources (e.g., virtual machines, block storage instances, etc.) to be provisioned for the user (or after the resources have been provisioned), the user may specify or select a termination policy to be used for the group of resources. Alternatively, the termination policy may be selected by the application running on the virtual machine instance, by the automatic scaling service or by other software executing in the computing environment. The termination policy will be used to determine which compute resources will be terminated (i.e., de-provisioned) first in an event of a scaling activity (e.g., when scaling down the number of resources allocated for the user). For example, a user (or application) may select a termination policy indicating that the newest virtual machine (VM) instances should be terminated first based on the assumption that older running VM instances have accumulated more data in their cache and are consequently operating more efficiently. Similarly, the termination policy may specify that the oldest VM instances should be terminated first, or that the VM instances with the oldest launch configurations should be terminated first. As another example, if the VM instances are billed to the user per hour (or other time interval), the termination policy may indicate that the VM instances which are nearest in time to the next billable time interval (e.g., instance-hour) should be terminated first. This may allow the user to save money by first terminating those instances which would be charged again to the user the soonest. In various other embodiments, the termination policy may be based on any other variables, as will be evident to one of ordinary skill in the art based on the teachings of this disclosure.

Once the user has selected a termination policy, an automatic scaling service may apply the selected termination policy when managing the resources for the user. In various embodiments, the scaling service may automatically scale the amount of resources (e.g., virtual machine instances) allocated to the user's application based on demand. The automatic scaling service may be a distributed service running in the data center of the service provider, or the automatic scaling service may be implemented within the host computing device, such as within the hypervisor or operating system of the host computing device. When demand for the user's application reaches a certain threshold, the scaling service may provision additional resources for the user's application, and similarly, when demand decreases, the scaling service may de-provision a portion of the resources allocated to the user. De-provisioning a resource may include shutting down a running VM instance, releasing resources allocated to the VM instance, or otherwise removing the resource instance from the group of resources provisioned for the user. For example, when CPU utilization in the group of virtual machine instances over a period of time increases above a certain threshold (e.g., 70%), the scaling service may automatically provision additional virtual machine instances for the user's application. Similarly, when CPU utilization decreases below another threshold (e.g., 40%) over a period of time, the scaling service may de-provision a portion of the virtual machine instances allocated to the user.

In various embodiments, the scaling service terminates the resources according to the selected termination policy. For example, if the policy indicates that the newest instances are to be terminated first, the scaling service may determine the launch time of each virtual machine instance and then select the virtual machine instances with the most recent launch time for termination. Similarly, if the policy indicates that the oldest instances are to be terminated first, the scaling service may select the VM instances having the oldest launch time. If the policy indicates that the resources with the oldest configuration are to be terminated first, the scaling service may determine the launch configuration version of each running VM instance and then select those VM instances which have the oldest configuration version for termination.

By utilizing the termination policies in this manner, the user is provided more control over the scaling of the resources allocated to their application. The user is thus enabled to prioritize a more stable or current version of their application, retain instances that have accumulated more application or cache data, run 'fresher' instances, or get the most running time out of each billable instance-hour.

FIG. 1 illustrates an example 100 of a user-specified termination policy used to control the scaling of resources allocated to a user, in accordance with various embodiments. In the illustrated embodiment, a service provider provisions a group of virtual machine instances 102 to run an application 105 for the user 104 on the physical resources 106 of the service provider. The service provider may also provision block data storage instance 107, as well as other resources that may be used to run the application for the user. The user may own one or more groups of resources (e.g., VM instances, block storage instances, etc.) and the user may be charged for using the resources, such as by billing the user per each hour of use of each virtual machine instance.

In various embodiments, the group of virtual machine instances 102 and/or the block data storage instances 107 may be scaled by an automatic scaling service 101. The automatic scaling service can respond automatically to changing runtime conditions during execution of the virtual machine instances and initiate automatic scaling activities (e.g., launching new instances or terminating existing instances) based on those conditions. In some embodiments, the user may specify how the scaling service 101 should respond to the changes in conditions. For example, the scaling service may provision additional virtual machine instances whenever the average CPU usage across the group of VM instances exceeds 70 percent for a specified time interval (e.g., 10 minutes). As another example, the automatic scaling service may provision additional block storage instances when the application demands additional data storage. Similarly, the automatic scaling service 101 may terminate (i.e., de-provision) half of the VM instances of the group over the weekend when traffic is expected to be low. The scaling service 101 may also automatically replace a VM instance when it deems that the VM instance is unhealthy based on its operating metrics. In various embodiments, the scaling service 101 may initiate scaling activities based on changes in any number of specified conditions, such as traffic patterns, resource utilization, or the like.

In various embodiments, the user 104 can specify a termination policy 103 to use for automatically scaling the VM instance group 102. The termination policy can be selected by the user from a list of available termination policies, such as by using an application programming interface (API), command line interface or any other interface. The user 104 can either select the termination policy 104 when creating a new group of VM instances or the user can update an existing VM instance group to use the termination policy 103. If the user is updating an existing group of VM instances, then the new termination policy will be executed when the next scaling activity takes place for the group. In some embodiments, if the user does not specify a termination policy, the scaling service 101 may apply a default termination policy preconfigured by the service provider. In other embodiments, the termination policy may be selected by the application running on the virtual machine instances, by a computer system located at a facility controlled by the user, or by some other software executing in the multitenant computing environment. For example, the application may have information about its own health, deployment version or the like, and the application may use that information to select which termination policy should be applied to it. For example, the application may rank the virtual machine instances in terms of termination priority based on information available to the application. In some embodiments, the application may provide the information about the termination policy (e.g., priority, etc.) to the automatic scaling service and the automatic scaling service may apply the termination policy according to the information received from the application.

In various embodiments, the selected termination policy is used by the scaling service to select which virtual machine instance should be terminated in the event of a scaling activity that involves terminating one or more instances. In various embodiments, the termination policies available for selection by the user may include (but are not limited to) terminating the oldest instance, terminating the newest instance, terminating the instance with the oldest launch configuration, or terminating the instance nearest in time to the next billable time interval. For example, if the termination policy specifies that the oldest instance should be terminated in the event of a scaling activity, the scaling service may inspect the launch time of each instance and select the instance with the oldest launch time for termination. If the termination policy specifies that the instance with the oldest launch configuration should be terminated, the scaling service may inspect the configuration version of each running instance and select the instance with the oldest launch configuration. In various embodiments, the launch configuration is a set of parameters that the VM instance was configured with at the time of starting the VM instance. If the termination policy specifies that the instance closest in time to the next billable time interval should be terminated, the scaling service may determine which VM instance in the group will be the next instance to be billed to the user and select that instance for termination. By selecting the instance that is closest to the next billable time interval, the user can maximize the hours the VM instances execute while minimizing the billable time charged for those instances.

In various embodiments, the user may specify one or more of the available termination policies for the group of resources (e.g., VM instances, block storage instances, etc.). If the user specifies two termination policies, those policies will be applied in order until the scaling service is able to select the VM instances needed for termination by the scaling activity. Thus, if the scaling service is selecting one instance for termination, if more than one running instance matches the first specified policy in the list, the scaling service will go to the next policy on the list. If there are no more policies specified, it may randomly select between the instances that match the specified policy. For example, the user may specify the "oldest launch configuration" policy, followed by the "nearest to next billable time interval" policy. In the event of scaling down the group of instances, the scaling service may first attempt to select the VM instance that has the oldest launch configuration. However, there may be several instances that were launched with the same configuration and thus more than one instance may satisfy this policy. In that event, the scaling service may apply the second termination policy in the list and select the VM instance nearest to the next billable time interval (e.g., billable hour). If more than one VM instance still satisfies the list of termination policies, the scaling service may randomly select between the available instances.

In some embodiments, the virtual machine instances may have a tag (or other metadata) associated with the instance, where the tag indicates a termination priority in the event of scaling down the group of instances. For example, each of the VM instances in the group may have a priority from 1-100 associated therewith, and the scaling service may select the instance with the highest (or lowest) priority in the event of a scaling activity. This may allow the user to specify the precise order in which the VM instances will be terminated and thereby provide more granular control over the VM instances.

In some embodiments, the termination policies may be based on operating metrics associated with the VM instances. For example, a monitoring service may continuously or periodically monitor the running VM instances in the group and collect various metrics (e.g., execution data) for those instances. The termination policies may be based at least in part on those operating metrics. For example, the termination policy may specify that any instances having very high (i.e. higher than a specified threshold) memory utilization should be terminated first. Similarly, the termination policy may specify that any instances that are performing less work than other instances in the group should be terminated first. In some embodiments, the termination policies can also include information used to determine how many instances to terminate in addition to information for selecting the instances. For example, based on the age of the instances, the termination policy may instruct the scaling service to terminate all instances that are older than a specified time interval, or the like. Various other examples of such termination policies are possible, as will be evident to one of ordinary skill in the art based on the teachings of this disclosure.

Figure 2:
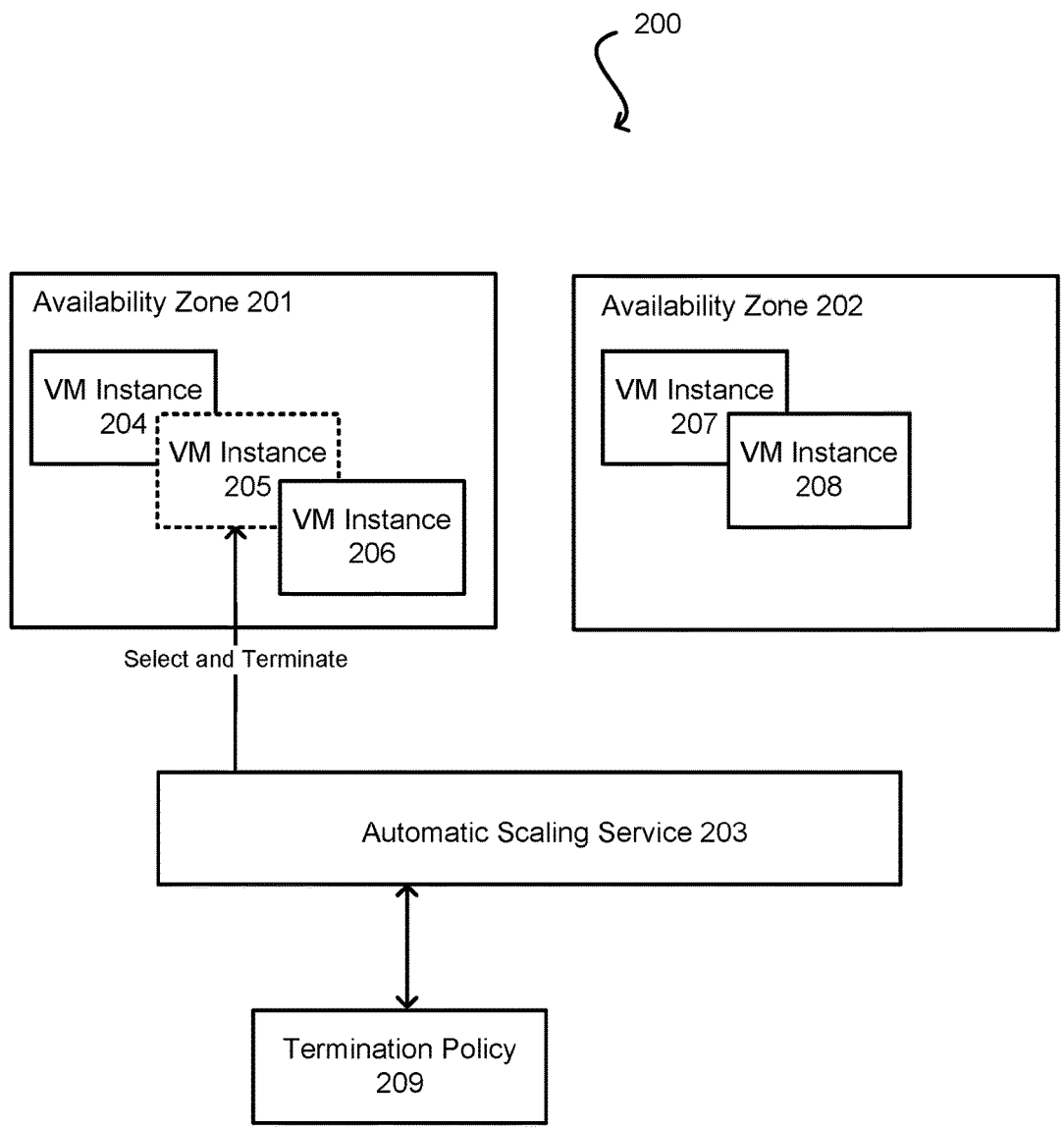
FIG. 2 illustrates an example of an automatic scaling service selecting between multiple availability zones when terminating a virtual machine instance, in accordance with various embodiments.

FIG. 2 illustrates an example 200 of an automatic scaling service selecting between multiple availability zones when terminating a virtual machine instance, in accordance with various embodiments. In the illustrated embodiment, the automatic scaling service 203 can respect the balancing of VM instances across multiple availability zones (201, 202) when selecting instances for termination. Availability zones are distinct locations within a geographical region (or located across several regions) that can be engineered to be isolated from failures in other availability zones and provide inexpensive, low-latency network connectivity to other availability zones. In various embodiments, the automatic scaling service 203 can take advantage of the safety and reliability of geographic redundancy by spanning virtual machine instance groups across multiple availability zones. When one availability zone becomes unhealthy or unavailable, the automatic scaling service can launch new VM instances in an unaffected availability zone. Similarly, when the unhealthy availability zone returns to a healthy state, the scaling service 203 can automatically redistribute the instances evenly across several designated availability zones.

In the illustrated embodiment, the virtual machine instance group is comprised of VM instances 204, 205, 206, 207, 208, which are distributed across two availability zones 201 and 202. When applying the termination policy 209, the automatic scaling service 203 can respect the even distribution across the availability zones. For example, when a scaling activity requires a termination of a VM instance, the automatic scaling service 203 may first select an availability zone from which the instance will be terminated. In this example, if it is desirable that the VM instance are evenly distributed across the two availability zones, the automatic scaling service 203 may select availability zone 201 since it has 3 virtual machine instances while availability zone 202 only has 2 VM instances running therein. In the illustrated embodiment, once the scaling service selects availability zone 201, the scaling service applies the termination policy 209 to select a VM instance from the availability zone 201 for termination. For example, the automatic scaling service 203 may select VM instance 205 because it satisfies the requirements of the termination policy 209. Notably, although VM instances 207, 208 in availability zone 202 may have also satisfied the requirements of the termination policy 209, in this particular embodiment, the automatic scaling service 203 selected the VM instance 205 in order to respect the balancing of instances across the availability zones 201 and 202. It should be noted that in various other embodiments, the automatic scaling service can select virtual machine instances (or other resources to terminate without regard to availability zones. For example, the automatic scaling service may select a virtual machine instance to terminate from the entire pool of virtual machine instances based on the termination policy (without first selecting an availability zone).

Figure 3:
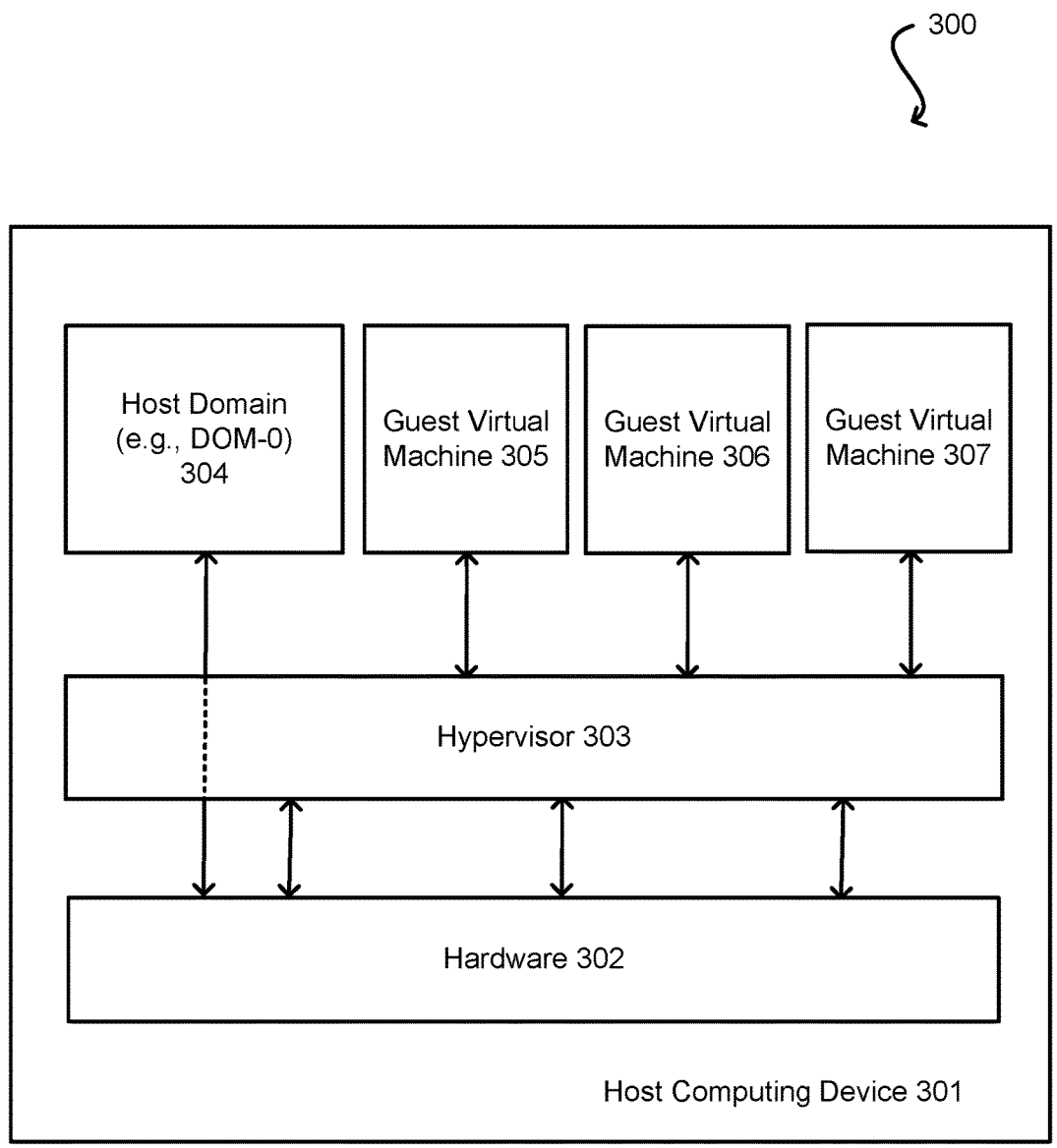
FIG. 3 illustrates an example of utilizing one virtualization technique using a hypervisor, in accordance with various embodiments.

As described throughout this disclosure, a number of virtualization techniques can be used to simultaneously operate a plurality of virtual machine instances on the resources (e.g., host computing device) of the service provider. FIG. 3 illustrates an example 300 of utilizing one virtualization technique using a hypervisor, in accordance with various embodiments. The hardware 302 of the host computing device 301 interfaces with a hypervisor 303 running directly on the hardware 302 (e.g., a "bare metal" or native hypervisor). Examples of such hypervisors include Xen, Hyper-V®, and the like. Hypervisors typically run at a higher, more privileged processor state than any other software on the machine, and provide services such as memory management and processor scheduling for dependent layers and/or domains. The most privileged of such layers and/or domains resides in the service domain layer, which may include a host domain 304 that may include an administrative operating system for configuring the operation and functionality of the hypervisor 303, as well as that of domains of lower privilege, such as the domains of the guest virtual machines (305, 306, 307) or other operating systems, which may be heterogeneous (e.g., running different operating systems than each other). The host domain 304 (e.g., DOM-0) may have direct access to the hardware resources 302 of the host computing device 301 by way of the hypervisor 303, while the guest virtual machine domains (305, 306, 307) may not.

Each of the virtual machine instances (305, 306, 307) may be assigned to (i.e., "owned by") at least one user, as previously described. The virtual machine instances on a single host computing device may all be owned by one user or may be owned by several users. Similarly, the VM instances (305, 306, 307) may all belong to a single group of VM instances or may belong to several groups of distinct groups. Each group of VM instances is automatically scaled by applying a termination policy associated with the group, as previously described.

Figure 4:
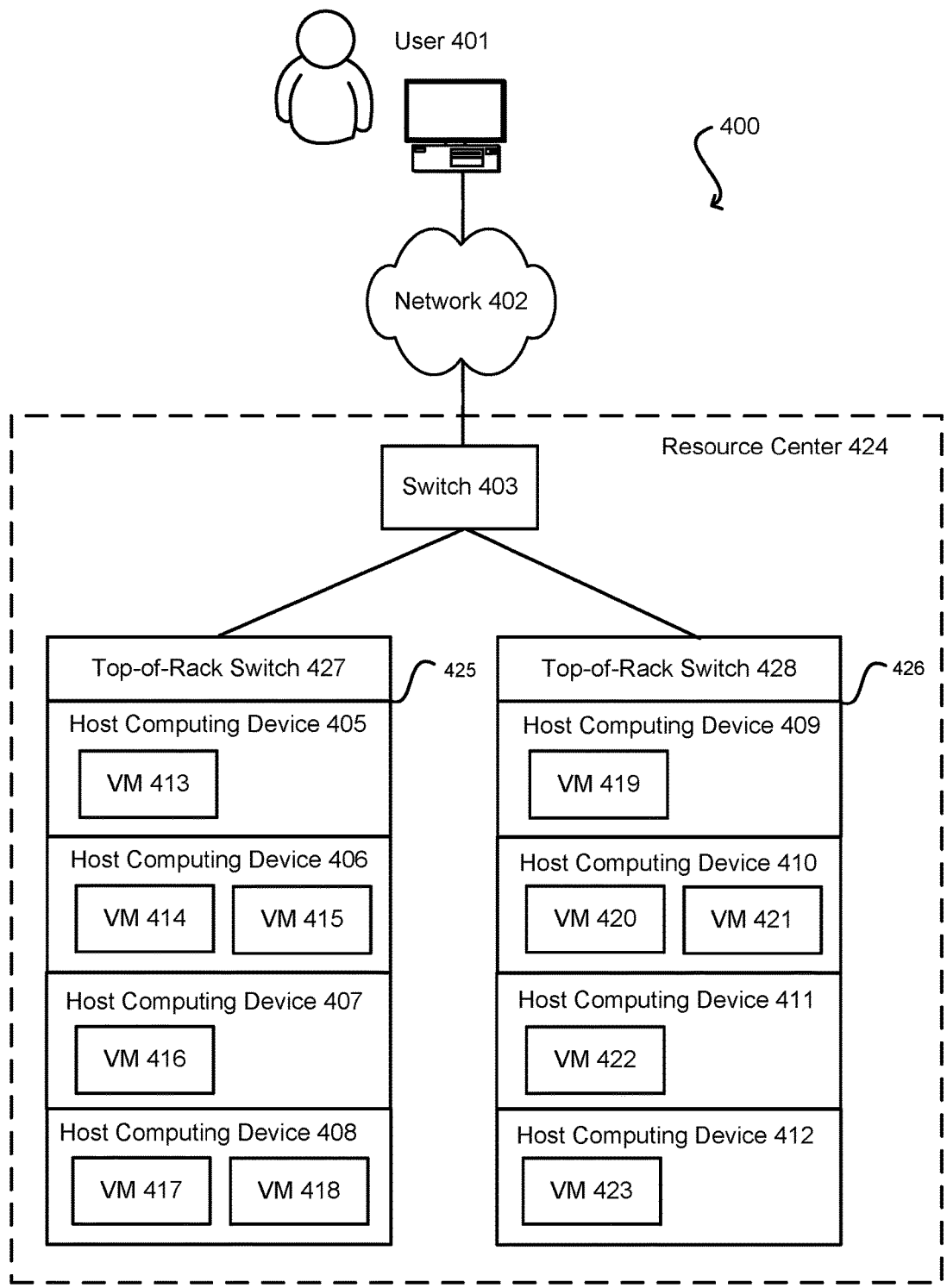
FIG. 4 illustrates an example of a resource center environment of the service provider, in accordance with various embodiments.

FIG. 4 illustrates an example 400 of a resource center environment of the service provider, in accordance with various embodiments. In the illustrated embodiment, a service provider (e.g., a cloud computing resource provider) can maintain one or more resource centers 423 (e.g., data centers, server farms, etc.) that store the physical resources (e.g., host computing devices, etc.) of the service provider. These physical resources can be used to host a number of guests (e.g., virtual machine instances) that can be provided to users 401 over a network 402, such as the Internet. For example, when a user wants to execute an application using the physical resources of the service provider, he or she may request the service provider to provision a virtual machine instance for the user, which will be used to deploy and execute the application. As demand for the user's application grows, the user can request that more virtual machines be provisioned to balance the load, request creation of one or more virtual private networks (VPNs) and the like.

In the illustrated example, the resource center 423 of the service provider may include one or more racks 421, 421 of host computing devices (406, 407, 408, 409, 410) wherein each host computing device on a particular rack is connected to a single top-of-rack (TOR) switch (427, 428). These TOR switches can be further connected to one or more other switches (424, 425) which enable the host computing devices to connect to the network. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANs), Intranets, Extranets, and the like. The resource centers can include any physical or logical grouping of resources, such as a data center, a server farm, content delivery network (CDN) point-of-presence (POP) and the like.

In accordance with an embodiment, each host computing device can include a virtualization layer (e.g., a hypervisor in combination with a Dom-0) that is used to host one or more guests (e.g., virtual machine instances (413, 414, 415, 416, 417, 418, 419)) that have been provisioned for the customers of the service provider to execute the various applications and services on behalf of those customers. Each guest (e.g., virtual machine) can be provisioned with its own operating system (OS) including a kernel, drivers, process management and the like.

When a customer wishes to obtain a virtual machine instance, the customer can first submit a request to the service provider, indicating the type of guest (e.g., VM) they would like to use. The service provider may carry out the processes to provision the guest which will be hosted on the physical resources (e.g., host computing devices) of the service provider. The guest can then be used to execute the various applications and services on behalf of the customer, utilizing the resources of the service provider.

In accordance with an embodiment, once a group of virtual machines are up and running a customer's application, the scaling service may need to add additional virtual machine instances to the group or terminate a portion of the running virtual machine instances in the group based on the demand for the application. For example, when demand increases, the scaling service may create one or more additional virtual machine instances and similarly, when demand decreases, the scaling service may terminate one or more running VM instances. In various embodiments, the scaling service may utilize the customer-specified termination policies to terminate the running VM instances, as described throughout this disclosure.

Figure 5:
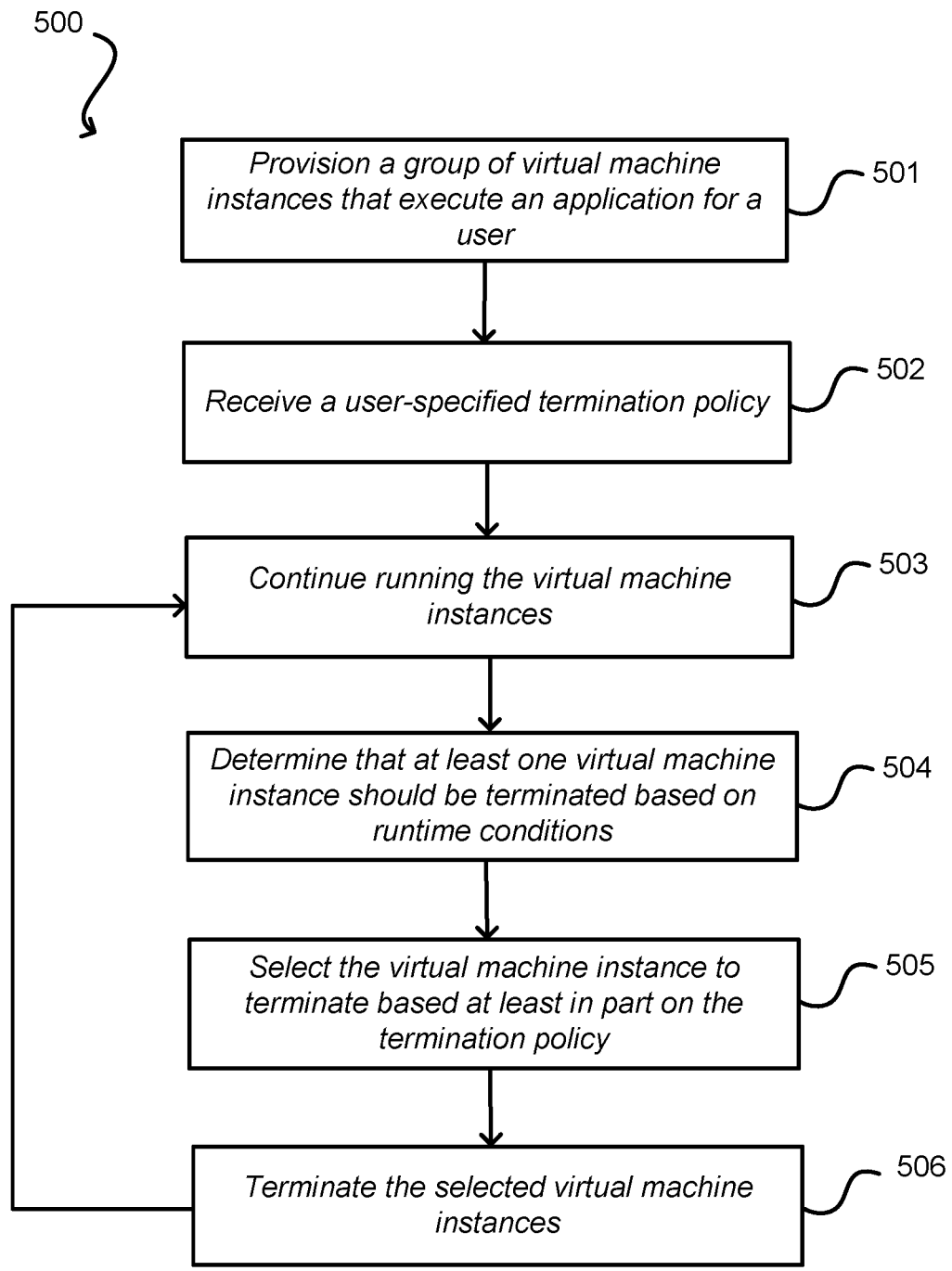
FIG. 5 illustrates an example process for using a termination policy to automatically scale compute resources, in accordance with various embodiments.

FIG. 5 illustrates an example process 500 for using a termination policy to automatically scale compute resources, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 501, the service provider provisions a group of virtual machine instances for a user on the resources (e.g., host computing devices) of the service provider. In an example configuration, the group of virtual machine instances together may execute one or more applications, or a web service, etc. on behalf of the user. In various embodiments, the group of virtual machine instances will be scaled up and down by an automatic scaling service according to changes in demand, resource utilization and other runtime conditions.

In operation 502, the service provider receives a user-specified termination policy to be used for managing the VM instance group. In one embodiment, the user selects the termination policy from a list of all available termination policies using a console, such as a web console. In the same or another embodiment, the user can send a user-specified termination policy to the service provider using an application programming interface call over a network to the service provider. In various embodiments, the termination policy indicates which VM instance should be terminated in the event of a scaling activity or one or more conditions for determining which instance to terminate. For example, the termination policy may indicate that the instance with the lowest CPU utilization should be terminated first, the most expensive type of instance being run should be terminated first, instances tagged with certain user defined metadata should be terminated first, the oldest instance should be terminated first, the newest instance should be terminated first, the instance with the oldest configuration should be terminated first, or the instance nearest to the next billable time interval should be terminated first. Similarly, in an embodiment, the termination policy may indicate a ranking by which to de-provision virtual machine instances. For example, the policy could state that instances of a given type (e.g., high-compute instances or high-memory instances) should be de-provisioned first and then if more de-provisioning is warranted the oldest instances should be de-provisioned. Alternatively, the policy could state that an instance of a given type should be de-provisioned and then the oldest instance should be de-provisioned and so on and so forth. As such, in this embodiment the automatic scaling service can parse the policy and generate a list for the virtual machines in an order based on the ranking specified in the termination policy.

In operation 503, the service provider continues running the virtual machine instances provisioned for the user in order to execute the users application or other service. In operation 504, at runtime, the automatic scaling service determines that at least one virtual machine instance in the group should be terminated based on one or more runtime conditions. For example, the automatic scaling service may determine that the CPU utilization across the entire group of VM instance has fallen below a predetermined threshold for longer than a specified time interval. Alternatively, the automatic scaling service may determine that the work week has ended and the group of VM instances should be scaled down because demand for the application is likely to be low for the next several days.

In operation 505, the automatic scaling service selects the virtual machine instance to terminate from the group based at least in part on applying the termination policy. For example, if the termination policy indicates that the newest VM instances should be terminated first, the automatic scaling service can select the VM instance with the most recent launch time for termination. In operation 506, the automatic scaling service terminates the selected virtual machine instance. The process may then loop back to operation 503, where the service provider continues running the virtual machine instances for the user until the instances are de-provisioned by the user or the scaling service determines that the other VM instances should be terminated or additional VM instances provisioned for the user.

Figure 6:
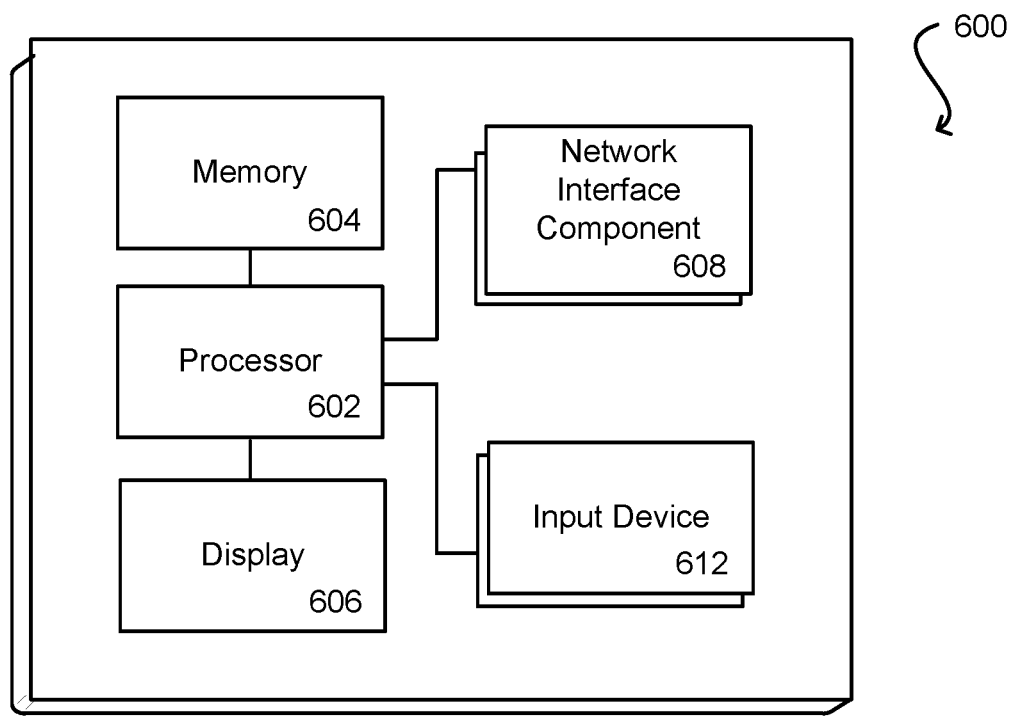
FIG. 6 illustrates a logical arrangement of a set of general components of an example computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Figure 7:
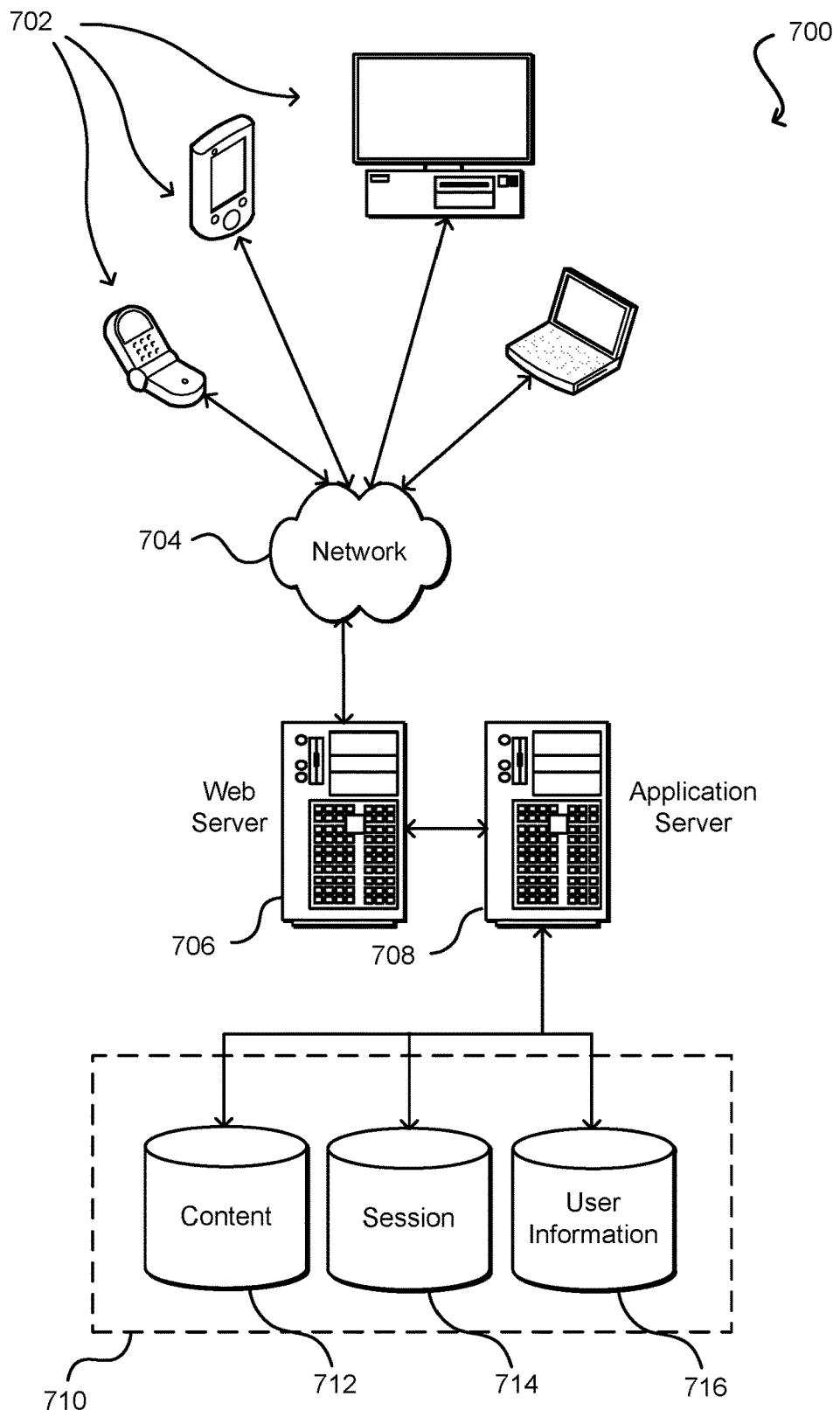
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for scaling compute resources, the method comprising:
   receiving a plurality of user-specified termination policies, including an ordering of attributes, that is used to select one or more virtual machine instances from a group of virtual machine instances to de-provision, the group of virtual machine instances having been provisioned for a user on one or more host computing devices and the ordering of attributes determining the order in which virtual machine instances should be de-provisioned;
   detecting that at least one virtual machine instance of the group of virtual machine instances should be de-provisioned based on one or more attributes associated with the at least one virtual machine instance;
   selecting the at least one virtual machine instance to de-provision based at least in part on applying a user-specified termination policy of the plurality of user-specific termination policies;
   applying the plurality of user-specified termination policies in a specified order until at least one virtual machine instance is selected to be de-provisioned; and
   de-provisioning the selected at least one virtual machine instance.

2. The computer implemented method of claim 1, wherein the one or more attributes associated with the at least one virtual machine instance include at least one of:
   a virtual machine instance that has been executing for a longest time interval;
   a virtual machine instance that has been executing for a shortest time interval;
   a virtual machine instance that has an oldest launch configuration; or
   a virtual machine instance that is nearest in time to a next billing time interval.

3. The computer implemented method of claim 1, wherein the plurality of user-specified termination policies have been ranked in the specified order by a user.

4. The computer implemented method of claim 1, wherein applying the plurality of user-specified termination policies in a specified order further comprises:
   determining a subset of the group of virtual machine instances that are associated with a first attribute specified by a first termination policy; and
   determining, from the subset of the group of virtual machine instances, at least one virtual machine instance that is associated with a second attribute; and
   de-provisioning the at least one virtual machine instance that is associated with the second attribute.

5. A computing device, comprising:
   at least one processor; and
   memory including instructions that, when executed by the processor, cause the computing device to:
   invoke a group of virtual machine instances;
   receive a plurality of user-specified termination policies ranked in order of execution that is used to select virtual machine instances in a group of virtual machine instances to de-provision, the group of virtual machine instances having been provisioned for a user on one or more host computing devices;
   determine that at least one virtual machine instance in the group of virtual machine instances should be de-provisioned;
   identify at least one virtual machine instance that is associated with at least one attribute specified by the user-specified termination policy;
   apply the plurality of user-specified termination policies in the order of execution until at least one virtual machine instance is selected for de-provisioning; and
   de-provision the at least one virtual machine instance that is associated with the at least one attribute.

6. The computing device of claim 5, wherein receiving a user-specified termination policy further comprises:
   receiving, from an application executing on the group of virtual machine instances, information used to select the at least one virtual machine instance to de-provision; and
   selecting the at least one virtual machine instance based at least in part on the information received from the application.

7. The computing device of claim 5, wherein the at least one attribute specified by the user-specified termination policy is one of:
   a launch time of a virtual machine instance;
   a configuration version of a virtual machine instance; or
   a billing time for use of a virtual machine instance.

8. The computing device of claim 5, wherein the instructions, when executed, further cause the computing device to:
   inspect metadata associated with each virtual machine instance, the metadata including attributes of the virtual machine instances;
   execute the user-specified termination policy to identify the at least one attribute specified by the user-specified termination policy; and
   select the at least one virtual machine instance to de-provision based on the attributes included in the metadata.

9. A non-transitory computer readable storage medium storing one or more sequences of instructions executed by one or more processors to:
   execute a group of virtual machine instances;
   receive a plurality of termination policies ranked in an order of execution that are used to select virtual machine instances in a group of virtual machine instances to de-provision, the group of virtual machine instances having been provisioned for a user on one or more host computing devices;

determine that at least one virtual machine instance in the group of virtual machine instances should be de-provisioned;

execute the plurality of termination policies in the order of execution until at least one virtual machine instance that is associated with at least one attribute that is specified by a termination policy of the plurality of termination policies is identified; and de-provision the at least one virtual machine instance that is associated with the at least one attribute.

10. The non-transitory computer readable storage medium of claim 9 further comprising instructions to:

determine a launch time of each virtual machine instance in the group of virtual machine instances; and select the at least one virtual machine instance to be de-provisioned based at least in part on the launch time of the at least one virtual machine instance.

11. The non-transitory computer readable storage medium of claim 9 further comprising instructions to:

determine a billing time interval for each virtual machine instance in the group of virtual machine instances; and select the at least one virtual machine instance to be de-provisioned based at least in part on identifying the virtual machine instance that is nearest in time to a billing time interval.

12. The non-transitory computer readable storage medium of claim 9 further comprising instructions to:

determine a configuration version of each virtual machine instance in the group of virtual machine instances; and select the at least one virtual machine instance having an oldest configuration version to be de-provisioned.

13. The non-transitory computer readable storage medium of claim 12, further comprising instructions to:

determine a subset of the group of virtual machine instances that is associated with an attribute specified by a first termination policy;

determine, from the subset of the group of virtual machine instances, at least one virtual machine instance that is associated with an attribute specified by a second termination policy; and de-provision the at least one virtual machine instance.

14. The non-transitory computer readable medium of claim 9, wherein the group of virtual machine instances is a group of compute resources hosted on one or more host computing devices, the group of compute resources executing at least one application for a user; and wherein selecting the at least one virtual machine instance to be de-provisioned is performed by an automatic scaling service configured to de-provision the at least one virtual machine instance based at least in part on one or more operating metrics associated with the virtual machine instances.

* * * * *